United States Patent [19]

Wackerle et al.

[11] 4,252,503

[45] Feb. 24, 1981

[54] ROTOR BLADE ESPECIALLY FOR ROTARY WING AIRCRAFT

[75] Inventors: Peter M. Wackerle, Ottobrunn; Otmar Friedberger, Neubiberg; Emil Weiland, Hohenbrunn, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 15,311

[22] Filed: Feb. 26, 1979

[30] Foreign Application Priority Data

Mar. 10, 1978 [DE] Fed. Rep. of Germany ....... 2810334

[51] Int. Cl.³ .............................................. B64C 27/38
[52] U.S. Cl. ..................................... 416/141; 416/138
[58] Field of Search ................ 416/134 A, 138 A, 141

[56] References Cited

U.S. PATENT DOCUMENTS

| 2,949,967 | 8/1960 | Jovanovich | 416/134 A |
| 3,231,222 | 1/1966 | Scheutzow | 416/134 A X |
| 3,261,407 | 7/1966 | Culver et al. | 416/134 A X |
| 3,330,362 | 7/1967 | Kastan | 416/141 X |
| 3,669,566 | 6/1972 | Bourquardez et al. | 416/141 X |
| 3,999,886 | 12/1976 | Ormiston et al. | 416/138 A X |
| 4,008,980 | 2/1977 | Noehren et al. | 416/134 A |
| 4,037,988 | 7/1977 | Laird | 416/141 |
| 4,053,258 | 10/1977 | Mouille | 416/141 X |
| 4,093,400 | 6/1978 | Rybicki | 416/141 |
| 4,104,003 | 8/1978 | Mouille | 416/141 |

FOREIGN PATENT DOCUMENTS 973587  10/1964  United Kingdom ..................... 416/141

Primary Examiner—Everette A. Powell, Jr.
Attorney, Agent, or Firm—W. G. Fasse; D. F. Gould

[57] ABSTRACT

A rotor blade has a neck section which connects the blade proper to a rotor head at the blade root. The neck section is flexible against bending in the lead-lag direction and in the flapping direction. A carrier member is located alongside or inside the neck section but spaced from the neck section. The carrier member is resistant against bending at least in the lead-lag direction or in the flapping direction. The carrier member is rigidly connected at its one end to the blade proper. A layer of a damping material is operatively interposed between the carrier member and the neck section, preferably at the blade root end of the neck section, whereby blade vibrations preferably in the lead-lag direction are damped and substantially prevented from entering into the rotor head.

9 Claims, 4 Drawing Figures

VIEW IN DETAIL A

VIEW IN DETAIL A

DETAIL A
BLADE AND FITTING NOT CUT

ROTOR BLADE ESPECIALLY FOR ROTARY WING AIRCRAFT

BACKGROUND OF THE INVENTION

The present invention relates to a rotor blade, especially for rotary wing aircraft. Such blades may be connected to the rotor head in a hingeless manner. For this purpose a neck section flexible in the lead-lag and in the flapping direction extends between the blade proper and the blade root, the latter comprising means for connection to the rotor head.

Such a rotor blade may be connected to the rotor hub without any lead-lag hinges and without any flapping hinges because the neck section takes over the function of these hinges. Thus, compared to rotors comprising such hinges, the structure without hinges is simpler and the weight, especially that of the rotor head, is reduced.

However, such rotor blades have a tendency to vibrate in an instable manner and it is necessary to avoid introducing such vibrations into the rotor head while simultaneously maintaining a simple blade structure.

OBJECTS OF THE INVENTION

In view of the above it is the aim of the invention to achieve the following objects singly or in combination:

to provide a highly efficient damping device for a rotor blade as described above;

to insert the damping device between the neck section proper and a substantially rigid carrier member which is preferably spaced from the neck section along its length except where the carrier member contacts the neck section through the vibration damping means; and to insert the vibration damping means between the carrier member and the neck section adjacent to the blade root end of the rotor blade.

SUMMARY OF THE INVENTION

According to the invention there is provided a rotor blade, especially for rotary wing aircraft, wherein a carrier member extends from the blade proper longitudinally relative to the neck section of the blade to the root of the blade. The carrier member is rigid against bending in the lead-lag direction and/or in the flapping direction. The radially outer end of the carrier member is rigidly connected to the blade section and an efficient damping elastic material is interposed between the carrier member and the neck section. Preferably the damping material is inserted in the form of a layer between the carrier member and the neck section adjacent to the blade root or the blade fitting where the blade is connected to the rotor head.

The carrier member according to the invention acts as a lever in response to a bending load to which the blade section proper may be subjected whereby the blade neck section is deformed accordingly. The movement of the carrier member relative to the blade neck section causes a shearing deformation of the damping layer. The size of the shearing deformation and accordingly the size of the damping force depends substantially on the length of the carrier member or on the spacing between the damping layer and the blade section proper. Therefore, it is possible to achieve a high degree of damping efficiency with a relatively small damping force where the carrier member has a comparatively large length.

The foregoing efficient damping is an advantage of the invention especially with regard to the operationally necessary aeroelastic characteristics of the rotor blade such as the flexibility of the blade neck section relative to bending loads. Besides, it is another advantage of the invention that the damping means used according to the invention may be integrated into the blade structure substantially without impairing the outer configuration or shape of the rotor blade.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
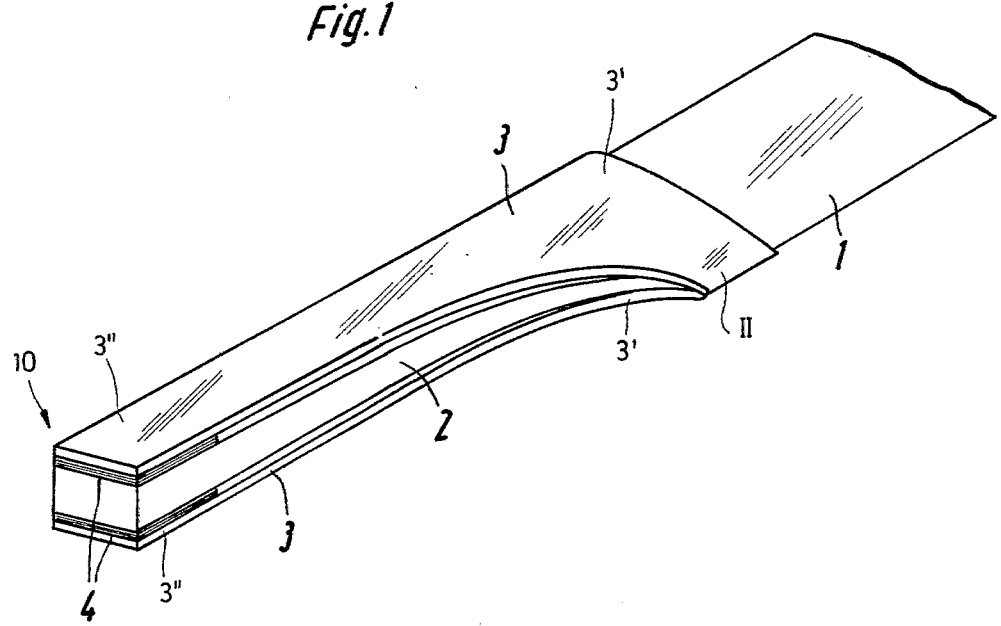
FIG. 1 is a perspective view of a first embodiment according to the invention showing a rotor blade with its neck section ending in the blade root, a carrier member or members extending alongside the neck section is rigidly connected to the radially inner end of the blade wing and damping material is interposed between the blade neck section and the carrier member or members.

FIG. 1 shows a perspective view of the radially inner end of a rotor blade 1 with its neck section 2 and its blade root 10 adjacent to the rotor head not shown. The details of the hardware conventionally used to connect the blade root 10 to the rotor head are also not shown since such details are not part of the invention.

Figure 3:
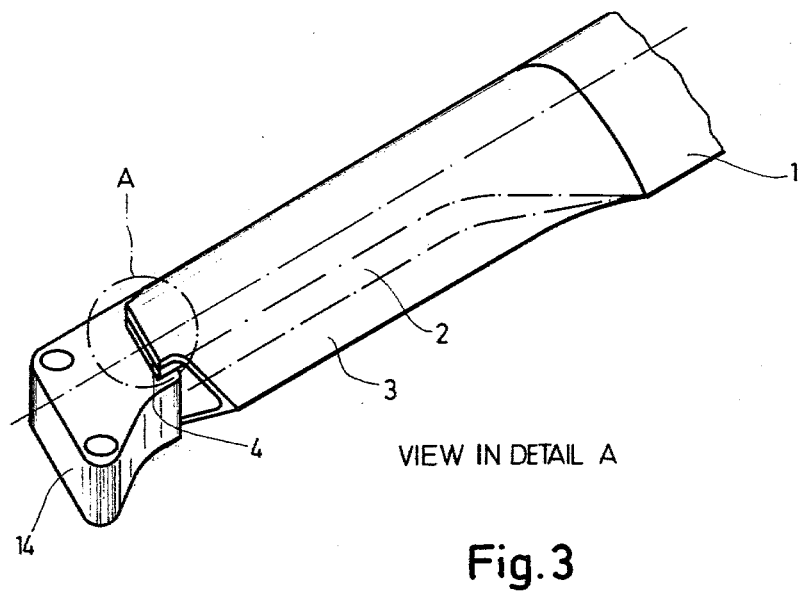
FIGS. 3 and 4 show a fitting for connecting the rotor blade neck to the rotor head.

The neck section 2 preferably forms an integral part or extension of the blade 1. The neck section 2 is flexible relative to bending loads in the lead-lag direction and in the flapping direction. For this purpose the neck section 2 is preferably made of fiber rovings such as glass fibers or carbon fibers embedded in a matrix of synthetic material such as synthetic resins whereby the fibers extend substantially in the longitudinal direction of the blade. Due to the flexible blade neck section 2 it is possible to secure the rotor blades to the rotor hub without any flapping hinges and without any lead-lag hinges, for example, by means of conventional hardware fittings 14 shown in FIG. 3 holding the neck section 2 at its root 10. Due to this hingeless connection it is possible that blade vibrations may occur and the invention damps these blade vibrations by means of carrier members 3 rigid against bending in at least one direction and which extend substantially in parallel to the flexible neck section 2. The carrier members 3 have radially outer ends 3' rigidly secured to the blade 1 by conventional means not shown, for example, a suitable adhesive or by welding where the blade and carrier members are made of steel. The radially inner ends 3" of the carrier members 3 are operatively connected in a vibration damping manner to the neck section 2 by means of rubber elastic inserts or layers 4.

Figure 4:
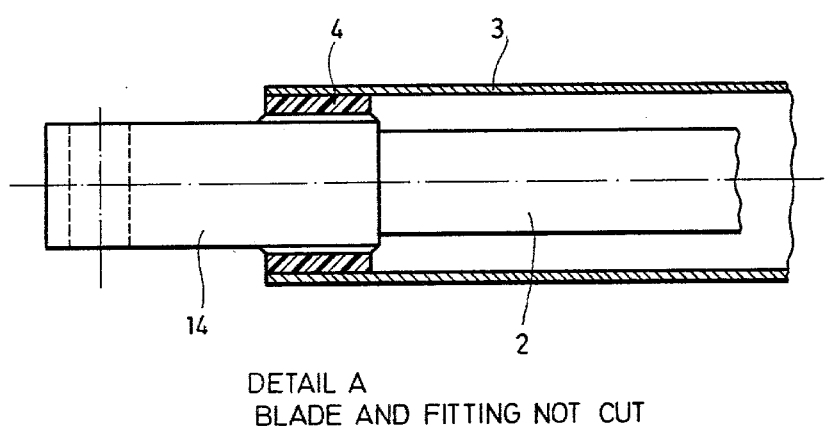

The carrier members 3, at least one of which should be used according to the invention, are arranged on the blade pressure side and/or the blade suction side for damping vibrations especially in the lead-lag direction. These carrier members 3 extend, as mentioned in parallel to the flexible neck section 2 and spaced therefrom substantially along the entire length of the neck section 2. The carrier members 3 form plates made, for example, of fiber mats which are impregnated by synthetic resins, whereby these carrier members 3 are substantially rigid against bending loads in the lead-lag direction and/or in the flapping direction. The damping material 4 such as silicone, polyurethane, or suitable rubber compounds or mixtures, is secured by an adhesive bond to the neck section 2 as well as to the respective carrier member or plate 3 please see FIG. 4. The adhesive bond will extend over the entire respective surface area. Such bonding is well known in the art. Where two carrier members 3 are used, they may be interconnected as shown at 11 where the radially outer ends 3' of the carrier members or plates 3 merge into or are rigidly secured to the blade 1.

The just described embodiment of a damping device according to the invention utilizes the principle of mechanical advantage in the force translation. Thus, the plates or carrier members 3 operate as levers when the blade section 1 is subject to a bending load. These levers transmit relatively large forces which are utilized in the shearing deformation of the damping layers 4, thereby obtaining a high damping degree or efficiency (>5% strutural damping ratio). If desired, for example, in order to increase the length of the lever arm of the plates 3, it is possible to elastically secure the radially inner ends 3" of these plates 3 by means of the damping layers 4 to the blade fitting 14 (FIG. 3) or even to a point on the rotor head separate from the rotor blade.

If desired, the plates 3 may form a sleeve completely surrounding the neck section 2. A portion of such sleeve is shown for example at 11 in FIG. 1.

Figure 2:
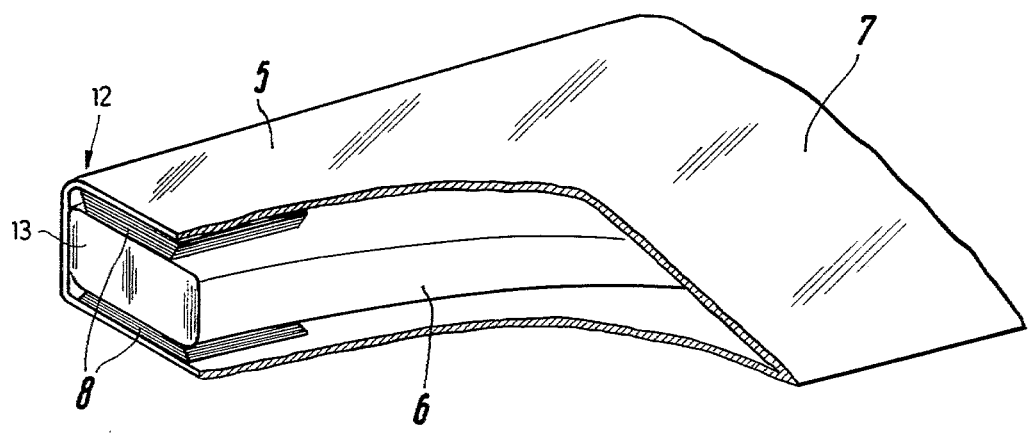
FIG. 2 shows another embodiment according to the invention wherein the carrier member is inserted into the neck section.

FIG. 2 illustrates an embodiment in which the neck section 5 is hollow forming a sleeve which surrounds an extension of a bending resistant core 6 of the blade wing section 7. The sleeve 5 envelopes the core 6 and is spaced from the core 6 at least on three sides as shown. The blade root end 12 of the neck section sleeve 5 is operatively connected to the respective end of the carrier member or core 6 by damping layers 8 secured to the core 6 and to the inner surfaces of the sleeve 5 by adhesive means suitable to bond the rubber elastic material of the damping layers 8 to the material of the sleeve 5 and of the core 6. The core 6 merges integrally into the core of the blade section proper 7.

In operation the core 6 of FIG. 2 acts as a lever arm. The motion of the lever arm relative to the neck section 5 causes a shearing deformation of the damping layers 8 interposed between the lever arm or carrier member 6 and the sleeve forming neck section 5. The just described embodiments of the invention are constructed for primarily damping vibrations effective in the lead-lag direction. Vibrations effective in the flapping direction of the rotor blade are normally sufficiently damped by the so-called aerodynamic damping or air damping. However, if desired, the damping according to the invention may be arranged to be effective in the lead-lag direction as well as in the flapping direction by providing, in addition to the damping layers 4 and 8 shown, further damping layers between the narrow sides of the neck section 2 and a carrier member sleeve completely surrounding the neck section 2 as shown at the right-hand end at 11 of FIG. 1. Similarly, additional damping layers may be interposed between the narrow sides of the carrier member or core extension 6 and the hollow neck section 5.

Although the invention has been described with reference to specific example embodiments, it will be appreciated, that it is intended to cover all modifications and equivalents within the scope of the appended claims.

What is claimed is:

1. A hingeless rotor blade, especially for rotary wing aircraft, comprising blade means, a blade root and a blade neck section (2 or 5) operatively connecting said blade means and said blade root, said blade neck section (2 or 5) being flexible relative to bending loads in the lead-lag direction and in the flapping direction, carrier means (3 or 6) resistant against bending in at least one direction, means rigidly connecting said carrier means (2 or 6) to said blade means, and damping means (4 or 8) directly and operatively interposed between said blade neck section (2 or 5) and said carrier means (3 or 6), whereby said carrier means are operatively connected in parallel to said blade neck section and operate as lever means when the blade neck section is subject to a bending load for transmitting a force into said damping means in accordance with the mechanical advantage of said lever means for substantially damping blade vibrations in accordance with said mechanical advantage and in said at least one direction.

2. The rotor blade of claim 1, wherein said carrier means comprise plate means arranged on the pressure side of said blade means.

3. The rotor blade of claim 1, wherein said carrier means comprise plate means arranged on the suction side of said blade means.

4. The rotor blade of claim 1, wherein said carrier means comprise a blade core extension forming an integral part of said blade means and extending longitudinally through said blade neck section.

5. The rotor blade of claim 4, wherein said damping means are operatively interposed between said blade neck section and said blade core extension at said blade root.

6. The rotor blade of claim 1, wherein said carrier means comprise plate means arranged along at least one side of said blade neck section.

7. The rotor blade of claim 6, wherein said damping means are operatively interposed between said plate means and said neck section at said blade root.

8. The rotor blade of claim 1, wherein said carrier means comprise two plates and wherein said blade neck section is sandwiched between said two plates substantially without direct contact between said blade neck section and said carrier plates.

9. The rotor blade of claim 1, wherein said carrier means comprise a core (6) stiff against bending and forming an extension of said blade means, and wherein said blade neck section comprises a hollow flexible sleeve (5), said stiff bar extending longitudinally through said hollow sleeve, said stiff core (6) acting as a lever arm relative to said hollow, flexible sleeve (5) for causing a shearing deformation of said damping means.

* * * * *